United States Patent Office 2,987,497
Patented June 6, 1961

2,987,497
VULCANIZATION OF BUTYL RUBBER WITH 2,6-DIMETHYLOL-3,5-DIMETHYL - 4 - CHLOROPHENOL, AND VULCANIZATE OBTAINED THEREBY
Richard Leshin, Akron, Ohio, assignor to The Goodyear Tire & Rubber Company, Akron, Ohio, a corporation of Ohio
No Drawing. Filed Dec. 24, 1958, Ser. No. 782,620
4 Claims. (Cl. 260—43)

This invention relates to a method of vulcanizing Butyl rubber and the vulcanizate obtained thereby.

It is known that rubbery polymers, both natural and synthetic, may be converted from a crude stock into a more useful stock through a process known as vulcanization using any one of a great number of vulcanizing agents, the most common of which is sulfur. Of the many man-made rubbers developed in recent years, particularly those based on the use of a conjugated diene, one of the most difficult to convert from a crude stock into a vulcanized stock having excellent heat and age resistance is the rubbery copolymer known in the trade as "Butyl" rubber, which is made by polymerizing a mixture of a major proportion (90–99.5% and preferably about 95–99.5%) of a $C_4$–$C_7$ isoolefin, usually isobutylene, and a minor proportion (10 to 0.5% and preferably about 5 to 9.5%) of a $C_4$–$C_8$ conjugated diolefin, usually isoprene or butadiene-1,3, in accordance with well known techniques as described, for example, in United States Patent 2,356,128. For purposes of convenience, this class of copolymers will be designated by the general term Butyl rubber.

It has now been discovered that Butyl rubber may be converted to a more heat and age resistant condition, and therefore a more useful product, by heating the Butyl rubber to vulcanization temperature in the presence of the specific compound, 2,6-dimethylol-3,5-dimethyl-4-chlorophenol having the formula

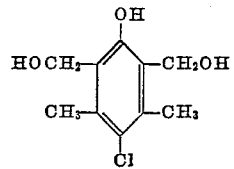

This compound may be prepared in accordance with the procedure set forth by S. R. Finn and G. J. Lewis in Journal of Applied Chemistry 1, 525 (1951).

The beneficial vulcanizing action discovered for 2,6-dimethylol-3,5-dimethyl-4-chlorophenol on Butyl rubber is most unexpected because, even though S. Van der Meer teaches in Mededeelingen van Het Kunststoffeninstituut der Rubber-Stitching Delft, No. 41, (1944), in an article entitled "The Vulcanization of Rubber With Phenol Formaldehyde Derivatives," on page 4 thereof that 2,6-dimethylol-4-chlorophenol and 2,6-dimethylol-3-methyl-4-chlorophenol will bring about the vulcanization of natural rubber and synthetic rubbers of the diene type, the use of these two compounds in Butyl rubber produces an initial vulcanization of Butyl rubber that deteriorates badly upon aging. This information would lead one to believe that the next higher homologue, 2,6-dimethylol-3,5-dimethyl-4-chlorophenol, would also behave in a similar manner. However, it was discovered that when Butyl rubber is cured with 2,6-dimethylol-3,5-dimethyl-4-chlorophenol physical properties are developed which are superior to those developed by the next lower homologue and most important these physical properties are not seriously affected by aging. It is most important and essential that Butyl rubber not deteriorate upon aging, for example, when subjected to steam and air, especially when the Butyl rubber is to be used in the construction of curing elements, pressure hose, conveyor belts, and Bag-O-Matic bladders for use in Bag-O-Matic tire presses as shown, for example, in Machinery and Equipment for Rubber and Plastics 1 314–19 (1952), and for other uses as shown, for example in United States Patent 2,857,357.

The following examples show the effect of 2,6-dimethylol-3,5-dimethyl-4-chlorophenol and the next lower homologues on curing Butyl rubber stock and how the properties of the cured stock are affected by aging for twelve hours in an autoclave charged with air and wet steam. All parts are by weight unless otherwise indicated.

|  | Example 1 | | Example 2 | | Example 3 | | Example 4 | | Example 5 | |
|---|---|---|---|---|---|---|---|---|---|---|
| Butyl Rubber (commercial grade of a copolymer of 98% isobutylene and 2% isoprene) | 100.00 | | 100.00 | | 100.00 | | 100.00 | | 100.00 | |
| Carbon Black | 50.00 | | 50.00 | | 50.00 | | 50.00 | | 50.00 | |
| Stearic Acid (Processing Aid) | 1.50 | | 1.50 | | 1.50 | | 1.50 | | 1.50 | |
| 2,6-Dimethylol-4-Chlorophenol | 12.00 | | | | | | | | | |
| 2,6-Dimethylol-3-Methyl-4-Chlorophenol | | | 12.00 | | 6.00 | | | | | |
| 2,6-Dimethylol-3,5-Dimethyl-4-Chlorophenol | | | | | | | 12.00 | | 6.00 | |
| Stannous Chloride Dihydrate ($SnCl_2.2H_2O$) (Activator) | | | | | 2.00 | | | | 2.00 | |
|  | Orig. | Aged | Orig. | Aged | Orig. | Aged | Orig. | Aged | Orig. | Aged |
| 300% Modulus: | | | | | | | | | | |
| 35/330° F | 290 | | 940 | | 1,620 | | 960 | | 1,980 | |
| 70/330° F | 480 | 1,430 | 1,320 | 1,320 | 1,900 | 2,230 | 1,220 | 1,170 | 2,510 | 2,570 |
| 140/330° F | 1,030 | TS | 1,550 | 1,340 | 2,080 | TS | 1,350 | 1,280 | 2,610 | 2,640 |
| Ult. Tensile: | | | | | | | | | | |
| 35/330° F | 570 | | 1,670 | | 2,560 | | 2,010 | | 2,620 | |
| 70/330° F | 1,200 | 1,430 | 1,990 | 1,330 | 2,720 | 2,260 | 2,180 | 1,480 | 2,850 | 2,620 |
| 140/330° F | 1,750 | 1,540 | 2,020 | 1,340 | 2,480 | 2,200 | 2,180 | 1,550 | 2,800 | 2,200 |
| Elongation at Break: | | | | | | | | | | |
| 35/330° F | 685 | | 550 | | 460 | | 620 | | 380 | |
| 70/330° F | 605 | 300 | 475 | 305 | 410 | 300 | 570 | 375 | 365 | 305 |
| 140/330° F | 490 | 295 | 405 | 300 | 345 | 285 | 495 | 350 | 325 | 305 |
| Shore Hardness: | | | | | | | | | | |
| 70/330° F | 75 | | 70 | | 60 | | 68 | | 62 | |
| 140/330° F | 73 | | 65 | | 59 | | 64 | | 61 | |
| Compression Set (ASTM Method B): | | | | | | | | | | |
| 70/330° F | 52.6 | | 24.4 | | 7.5 | | 19.6 | | 4.0 | |
| 140/330° F | 31.8 | | 19.1 | | 4.1 | | 13.0 | | 4.0 | |

TS—Too short to measure.

From the Examples 1 through 5 above, it is readily observed that 2,6-dimethylol-4-chlorophenol develops considerably less tensile strength at 300% modulus than does 2,6-dimethylol-3-methyl-4-chlorophenol which in turn develops less tensile than does the compound of this invention when cured for 35 minutes at 330° F. A correspondingly substantial improvement is also observed when the compound of this invention is used in combination with an activator such as stannous chloride over the next lower homologue when used with the same activator. The same general improvement is also observed with respect to the tensile strength developed at ultimate elongation. Most important, however, is the improvement in percent set which is developed by the compound of this invention over the next two lower homologues. The same general improvement is also to be observed when the compound of this invention is used in combination with stannous chloride in regard to compression set and taken in comparison with the next lower homologue, as shown in Example 3.

The curing agent of this invention useful in the cure of Butyl rubber may be used in amounts of from 1.0 part to 25.0 parts per 100 parts of rubber. It is preferred to use from 6.0 to 12.0 parts.

Although the next lower homologue of the curing agent of this invention cures Butyl rubber when used in combination with a vulcanization accelerator, the resulting cured Butyl rubber does not have as desirable physical properties as does Butyl rubber when cured with 2,6-dimethylol-3,5-dimethyl-4-chlorophenol used either without a vulcanization accelerator as shown in Example 4 or with a vulcanization accelerator as shown in Example 5. The resulting cured Butyl composition made in accordance with the foregoing examples possesses better hot elongation properties, better resistance to crack growth, greater resistance to tear, and has a lesser modulus increase than when Butyl rubber is cured with other types of phenol dialcohols, as for example polymers of 2,6-dimethylol-4-hydrocarbon substituted phenol and polymers of 2,6-dimethylol-3,4,5-hydrocarbon substituted phenol. The cured Butyl stock of this invention may be used under more severe conditions of heat and stress than when Butyl stock is cured with other known curing agents. Additionally, the curing agent of this invention produces efficient and economical cures of Butyl rubber without the use of a vulcanization accelerator. Additionally, the curing agent of this invention may be used in its naturally recovered state, which is a fine crystalline material. Other phenol dialcohols particularly of a resinous nature must be ground to a very fine state before they may be used as curing agents for Butyl rubber since they are not otherwise readily dispersed in the Butyl rubber being cured as is the case of the vulcanization accelerator of this invention.

Should it be desired to use a vulcanization accelerator in combination with 2,6-dimethylol-3,5-dimethyl-4-chlorophenol, chlorinated compounds are particularly useful including chlorinated Butyl rubber; chlorosulfonated polyethylene; chlorinated paraffin wax; heavy metal halides such as stannous chloride, ferric chloride, aluminum chloride, chromium chloride, nickel chloride, cobalt chloride, manganese chloride, and copper chloride.

Butyl rubber cured in this manner may also be compounded in any well known and conventional manner using plasticizers such as mineral oil, carbon black, zinc oxide, stearic acid, zinc stearate, and other well known compounding ingredients to bring about the desired effects in the vulcanized state. The Butyl rubber may be compounded in a conventional way using rubber mixing equipment such as an internal mixer or roll mills.

The resulting compounded Butyl rubber may be fabricated into any desired form by the usual methods such as calendering, extrusion, or molding, and is admirably adapted in the manufacture of such articles as curing elements useful under extreme conditions of heat and pressure, as for example useful in the manufacture of a curing bag which is used in shaping a pneumatic tire within a mold. It is observed that curing elements of this nature have a greater useful life than when made from Butyl rubber treated with conventional curing compounds, such as the quinone-dioxime type of cure as described in Industrial and Engineering Chemistry 40, 2314–19 (1948); U.S. 2,393,321 (1946); and in a technical bulletin by the Enjay Company entitled "Butyl 1948."

The curing process of the invention is conventionally carried out at temperatures of 200° F. up to 400° F. for periods of time ranging from about five minutes to about three hours and preferably within a vulcanizing temperature range of about 300° to 350° F.

The Butyl rubber used in the examples above was made by reacting 96 parts by weight of isobutylene with 4 parts by weight of isoprene dissolved in methyl chloride and then polymerized at −100° C. in the presence of 0.2 part by weight of aluminum chloride. The resulting copolymer contained 98% by weight of isobutylene and 2% by weight of isoprene.

While certain representative embodiments and details have been shown for the purpose of illustrating the invention, it will be apparent to those skilled in this art that various changes and modifications may be made therein without departing from the spirit or scope of the invention.

What is claimed is:

1. An elastic vulcanizate comprising a rubbery copolymer of an isoolefin having from 4 to 7 carbon atoms with from 0.5 to 10% of a conjugated diolefin having from 4 to 8 carbon atoms, vulcanized with from 1 to 25 parts of 2,6-dimethylol-3,5-dimethyl-4-chlorophenol per 100 parts of the rubbery copolymer.

2. The vulcanizate of claim 1 in which an accelerator of vulcanization is present during the vulcanization.

3. The vulcanizate of claim 2 in which the accelerator is stannous chloride.

4. A method of vulcanizing Butyl rubber which comprises the steps of mixing a rubbery copolymer of an isoolefin having from 4 to 7 carbon atoms with from 0.5 to 10% of a conjugated diolefin having from 4 to 8 carbon atoms with 2,6-dimethylol-3,5-dimethyl-4-chlorophenol, shaping the said mixture and thereafter heating the said mixture at a temperature of from 200° F. to 400° F. until the mixture is converted to an elastic vulcanized state.

References Cited in the file of this patent

UNITED STATES PATENTS

| | | |
|---|---|---|
| 2,726,224 | Peterson et al. | Dec. 6, 1955 |
| 2,808,445 | D'Amico | Oct. 1, 1957 |

OTHER REFERENCES

Van der Meer: Recueil des Travaux Chimiques des Pays-Bas, volume 63, No. 40 (1944), pages 147–169, page 150 relied upon.